Nov. 8, 1960 L. S. TWOMEY 2,959,022
MANIPULATION OF NITROGEN-CONTAMINATED NATURAL GASES
Original Filed Aug. 4, 1949 4 Sheets-Sheet 1

FIG. I

INVENTOR.
L. S. TWOMEY
BY
ATTORNEY

Nov. 8, 1960  L. S. TWOMEY  2,959,022
MANIPULATION OF NITROGEN-CONTAMINATED NATURAL GASES
Original Filed Aug. 4, 1949  4 Sheets-Sheet 2

INVENTOR.
L. S. TWOMEY
BY
ATTORNEY

INVENTOR.
L. S. TWOMEY

Nov. 8, 1960 L. S. TWOMEY 2,959,022
MANIPULATION OF NITROGEN-CONTAMINATED NATURAL GASES
Original Filed Aug. 4, 1949 4 Sheets-Sheet 4

INVENTOR.
L. S. TWOMEY
BY
ATTORNEY

United States Patent Office 2,959,022
Patented Nov. 8, 1960

2,959,022

MANIPULATION OF NITROGEN-CONTAMINATED NATURAL GASES

Lee S. Twomey, Vista, Calif.

Filed Dec. 5, 1952, Ser. No. 324,163

5 Claims. (Cl. 62—30)

This application is a division of my copending application Serial No. 108,631, filed August 4, 1949, now Patent No. 2,696,088, and having the same title. It relates to the transportation, purification, storage and distribution of natural hydrocarbon gases initially contaminated by material proportions of nitrogen.

Certain portions of the United States, notably western Kansas, southwestern Colorado, and the Texas Panhandle, produce great quantities of natural gas containing up to forty percent by volume of nitrogen. The great part of this gas finds a market only at a considerable distance from the field and must be transported through pipe lines for hundreds of miles, at a cost which often materially exceeds the value of the gas at the well-head.

The separation and rejection of part or all of the original nitrogen content has important advantages, even when this step is performed at the delivery end of the transmission line, and even greater advantages when the removal is effected before the gas is transported over a great distance. The step is particularly effective and advantageous when combined with storage of part of the purified gas at a point more or less adjacent to that at which the gas is distributed and used, or when the step of purification is combined with the recovery of liquid hydrocarbons from the purified gas. The nature of these advantages and the various manners in which they may best be realized will be referred to in detail hereinafter.

Various methods for separating the contaminating nitrogen from the natural gas are available, the present specification describing only the general method in which separation is effected by liquefaction of the entire feed stream and fractionation of the resultant liquid in a suitable column. This method of separation may be employed either in the field or at the delivery end of a long distance transmission line, or at some convenient intermediate point, and may be combined with storage of part or all of the purified gas and with the recovery of valuable liquid hydrocarbons from the gas.

The invention may best be described with reference to the attached drawings and the following description thereof, in which.

Figure 3:
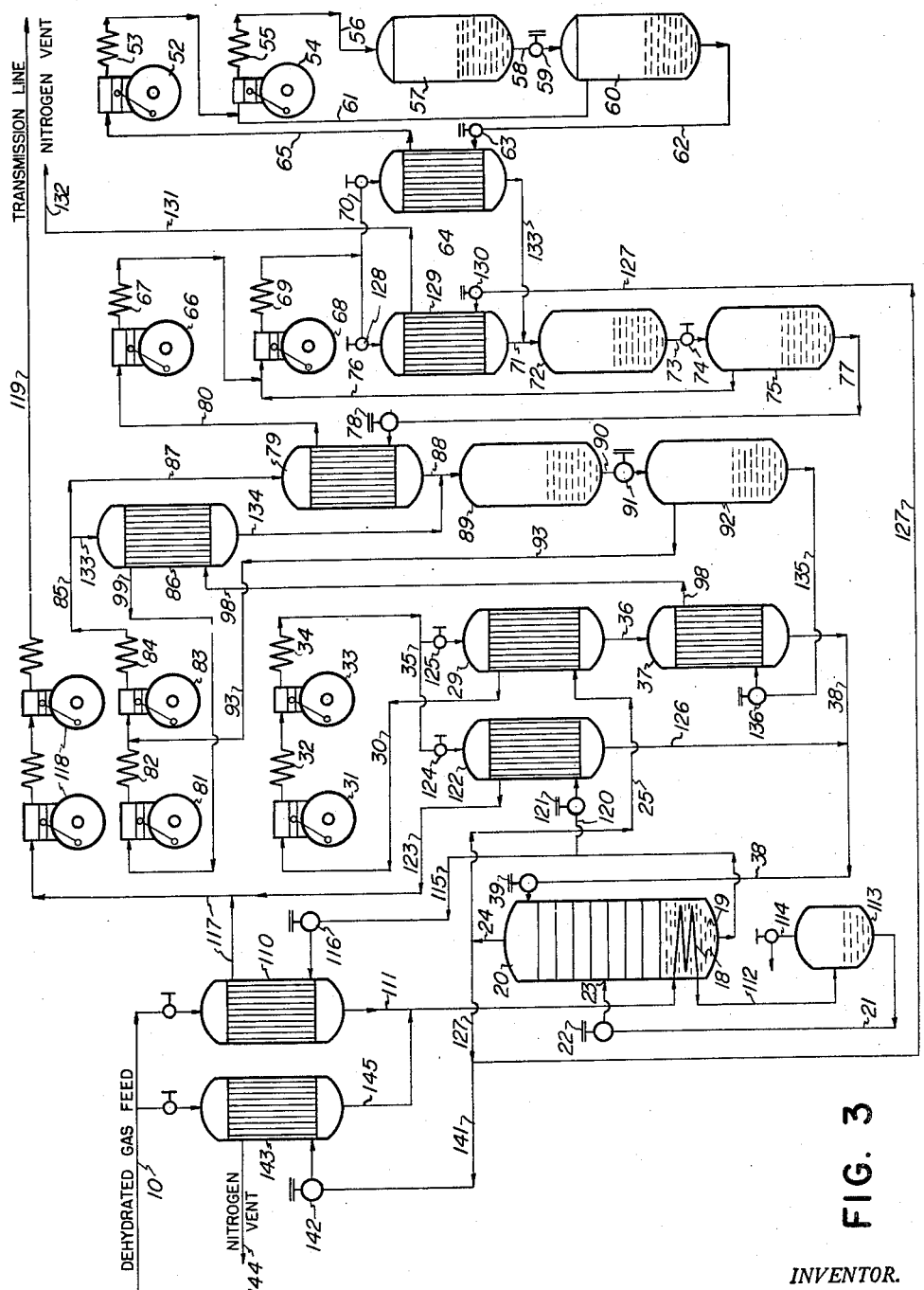
Figure 4:
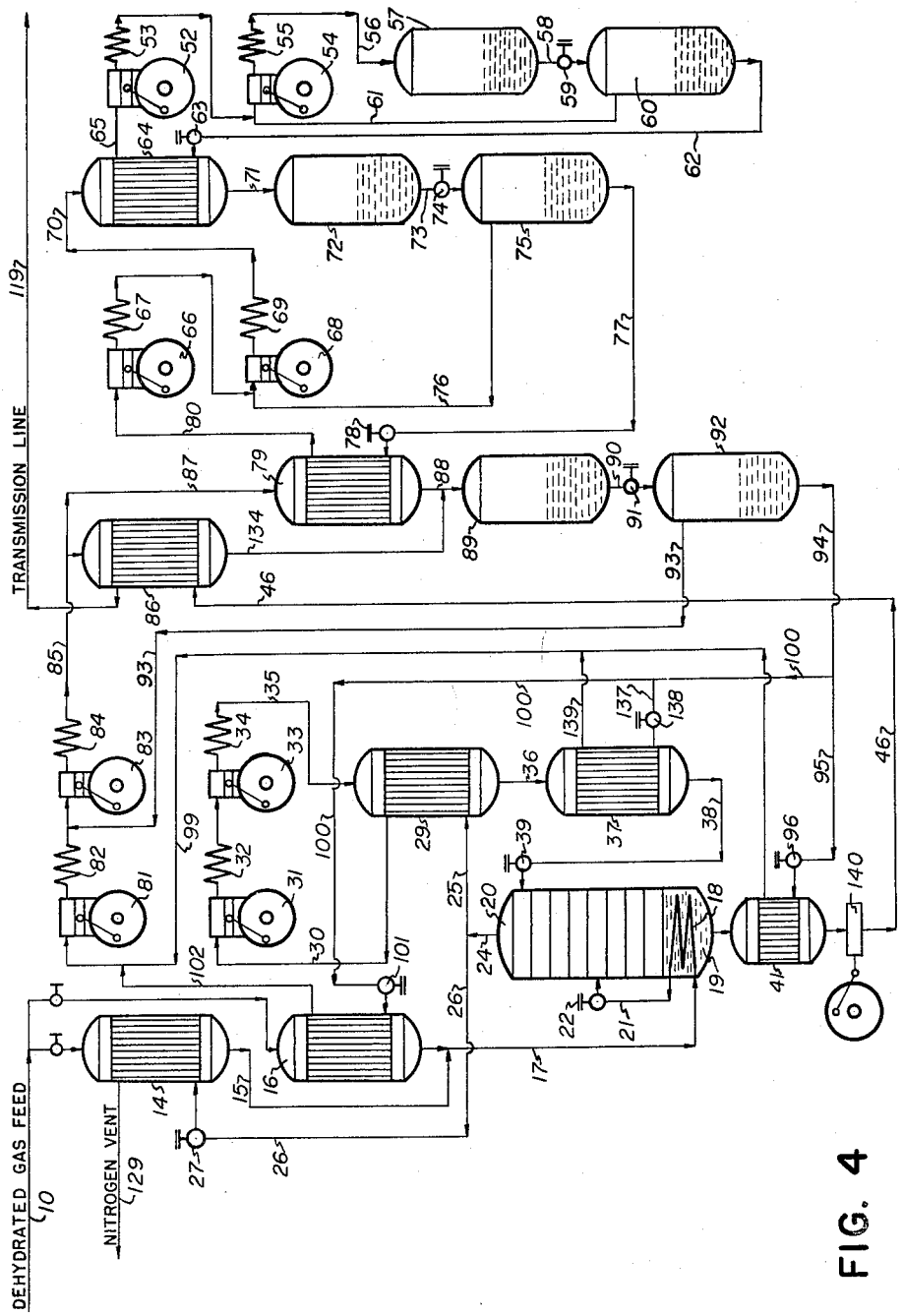

Fig. 3 illustrates a modification of the operation in which the purified gas is obtained in the form of a vapor at low pressure and is recompressed for delivery into a long distance transmission line, and Fig. 4 illustrates another modification in which the purified gas, delivered from the column as a liquid, is pumped in liquid form through a vaporizing interchanger and thus delivered into the transmission line under the pressure created by the liquid pump.

Figure 1:
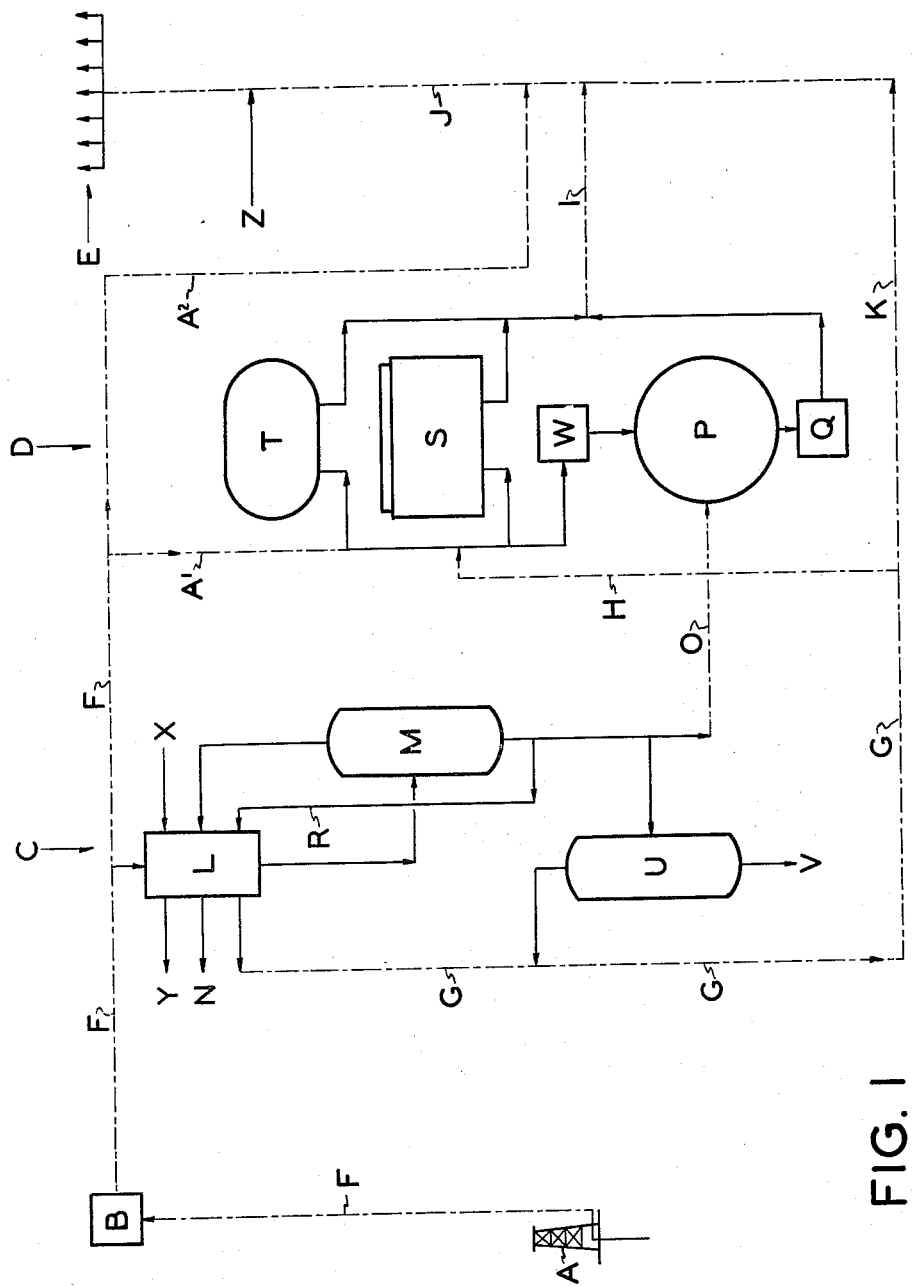
Fig. 1 is a diagram illustrating the essential steps of the process, devoid of detail and describing various permissible alternatives of procedure.

Referring first to Fig. 1, A indicates a gas field producing nitrogen-contaminated natural gas; B is a dehydrating unit in which the gas is deprived of carbon dioxide, hydrogen sulfid and water vapor; C is a fractionating system as described in detail in connection with Figs. 2, 3 and 4; D is a gas storage system and E is a distributing system such as a city gas service. The locations of elements A and E are, of course, fixed by circumstances and not controllable.

The other three principal elements may be located as convenient: thus, the treating unit must be between the field and the fractionating plant but may be adjacent to either if they are separated; the fractionating plant and the storage plant (if provided) may each be adjacent to the field or adjacent to the distribution area or at a medial point, and finally, the fractionating plant and the storage plant may be closely adjacent or may be separated by any convenient distance.

Fig. 1 shows a line F—F connecting the field with the fractionating plant, with treating unit B located anywhere between A and C; a gas line G—H connecting the fractionating plant with the storage plant; a liquid line O connecting the fractionating plant with the storage plant, useful only if these two elements are closely enough adjacent to permit the transfer of a liquefied gas in liquid form; a gas line G—K—J connecting the fractionating plant directly with distribution and bypassing storage; a gas line I—J connecting the storage with distribution; a gas line F—A1 connecting the field with the distribution area and bypassing storage. With such lines, of lengths determined by the relative locations of the units, it is possible to take care of any desired alternatives of procedure.

The line indicated at Z is for the purpose of introducing a diluent gas as later described. Raw gas from the field may be used as a diluent by introduction to line J through line A2.

The fractionating system illustrated in detail in later figures consists first of a series or group of interchangers L in which the feed gas is refrigerated, the cooled or liquefied gas passing to a conventional fractionating column M, for example, one provided with bubble plates, in which a desired portion of the nitrogen of the raw gas is removed as a top cut, which effects part of the cooling of the feed gas in L and is vented at N. The column bottoms, a liquid richer in hydrocarbons than the feed gas, may pass through a relatively short connection O, in the liquid condition, to a liquid phase storage vessel P from which the liquid is withdrawn as required through a vaporizer Q to be sent to distribution. Or the bottom liquid may pass through a conduit R to refrigerating unit L in which it is vaporized in effecting part of the cooling of the feed gas, passing thence in gaseous form through G—H to low pressure gaseous storage S or high pressure gaseous storage T, or through G—K—J to the distributing system E. Or as a third alternative, the column bottoms may be directed to a refractionating column U from which a bottom cut consisting of propane and heavier hydrocarbons is withdrawn at V while the top cut, consisting mainly of methane and ethane, passes to conduit G and thus to gaseous storage in S or T, or to a reliquefier W which places it in liquid storage P, or direct to distribution system E. In instances in which the fractionation plant and the storage system are separated by a distance too great for the transmission as a liquid of the bottom cut from column M, reliquefier W will take care not only of the top cut from column U but also of the revaporized bottom cut from column M.

Any make-up refrigeration required in L will be supplied by the evaporation of a liquefied gas, such as liquid methane, introduced from an extraneous source at X and returned from Y to its source.

Figure 2:
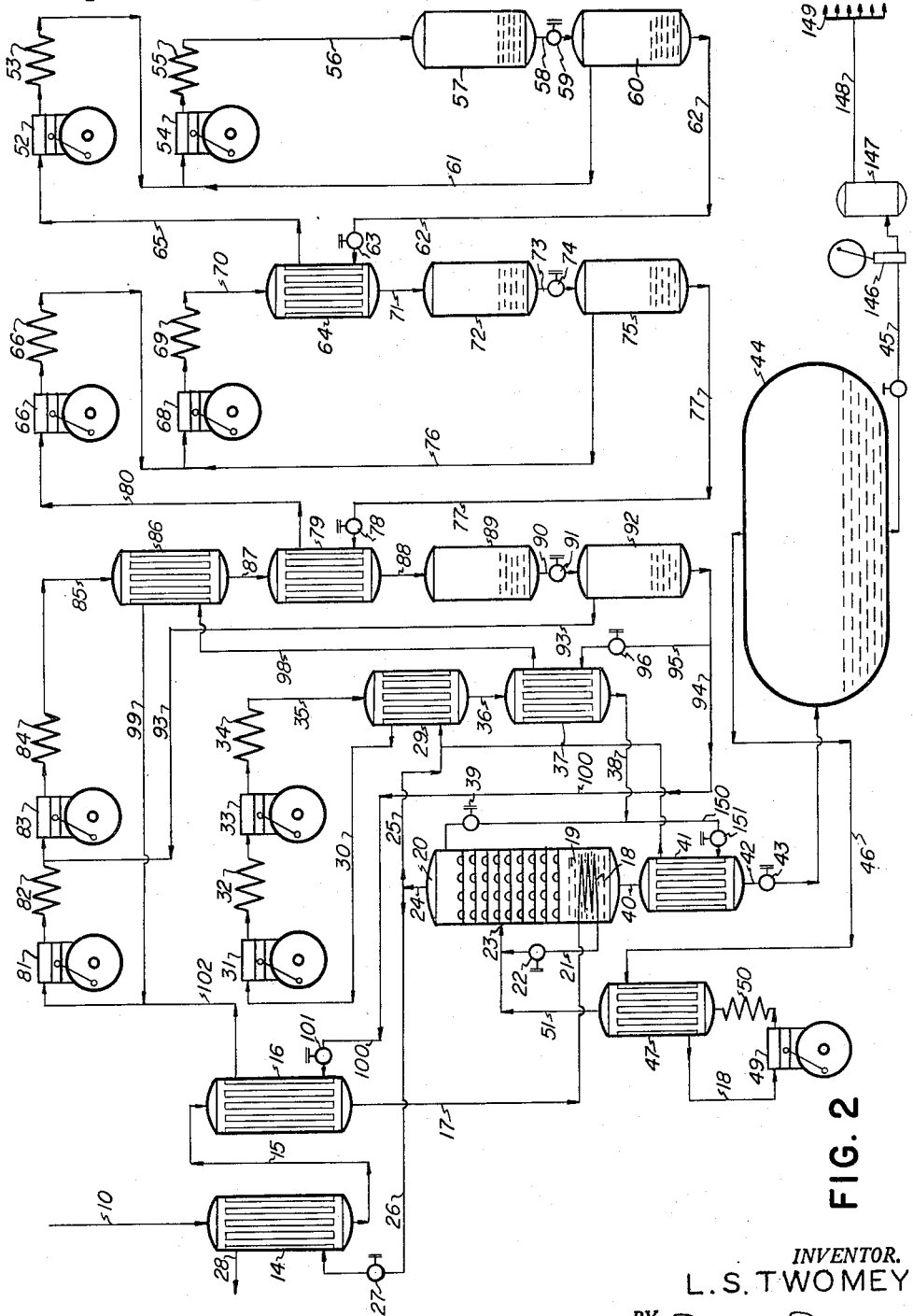
Fig. 2 is a flow-sheet of an operation and assemblage of apparatus for performing the actual separation of nitrogen and providing the extraneous refrigeration required by the system, the purified gas being stored in liquid form.

Referring now to Fig. 2, illustrating a method which delivers the purified gas in liquid form into liquid storage: an actual pipe line supply of nitrogen-contaminated fuel gas in taken by way of example, this gas containing 90.7% of hydrocarbons, mainly methane, and 9.3% of lower boiling components, almost entirely nitrogen. In the ensuing description, percentages are in mol percents, pressures are in atmospheres absolute and temperatures in degrees Kelvin. All the figures given are close approximations, fractions being substituted by the nearest round figure. It will be understood that the pressure and temperature relations recited are illustrative and not limiting. They will vary to some extent with changes in composition of the gas and may be varied, within limits, at the will of the operator.

Gas from the field, previously substantially freed from carbon dioxide, hydrogen sulfid and water vapor, and at an assumed pressure of 12 atmospheres, enters the system through the line 10, which will ordinarily though not necessarily be the delivery end of a long distance transmission line. This gas enters an interchanger 14 in which it is cooled to about 285° by separated nitrogen leaving the system. It then passes through conduit 15 to interchanger 16 in which its temperature is reduced to about 134° by an expanded and evaporating stream of liquid methane produced by a cascade liquefying system later described. At this temperature and at substantially the original pressure of 12 atmospheres the gas is about 93% liquefied.

The partially liquefied stream passes through conduit 17 to a boiling and condensing coil 18 immersed in a pool 19 of liquid, substantially pure methane in the base of a fractionating column 20 (column D of Fig. 1). In this coil liquefaction is completed, the liquid stream passing through conduit 21 and expansion valve 22 and entering the column at a medial height as at 23.

It should be understood that while liquefaction of the feed stream prior to entry into the column is desirable, as restricting the column to a minimum size, it is entirely possible to feed to the column a partially liquefied feed stream, or even a gaseous stream, in such cases the liquefaction requisite for fractionation being produced within the column by increasing the quantity of reflux liquid.

The column may be of the single stage type and may be maintained at 3 atmospheres pressure. With a sufficient number of effective plates, the temperature in pool 19 will be about 125° and the vapor temperature at the upper end of the column about 89° K. The composition of the vapor vented at 24 will be about 99% nitrogen and 1% methane.

The vent vapor is divided at the column outlet, a portion passing through conduit 25 to a nitrogen liquefying cycle later described while a quantity equal to that momentarily separated from the gas feed passes through conduit 26 to an expansion valve 27 by which its pressure is reduced to about 1 atm. and its temperature to about 86°. The vent then passes through interchanger 14, in which its temperature is raised to 290° in effecting the first cooling of the gas feed, and is discharged from the system at 28.

The column is provided with reflux liquid by a nitrogen liquefaction cycle taking gas from the top of the column through conduit 25. The gas passes first through an interchanger 29 in which its temperature is raised to 305° in cooling a compressed and water-cooled nitrogen stream, then through conduit 30 to two stages of compression 31 and 33 with interposed water-cooling at 32 and final water-cooling at 34. The water-cooled stream, at a pressure of 25 atmospheres, is cooled to 129° in interchanger 29 in heating the stream of nitrogen passing to the first stage of compression.

The refrigerated nitrogen then passes through conduit 36 to interchanger 37 in which it is cooled to 120° and is liquefied by interchange against cold methane vapor from a source later described. The liquefied stream passes through conduit 38 and expansion valve 39, by which it is reduced to column pressure, and enters the upper end of the column in which it functions as reflux liquid.

Returning now to the bottom of the column the liquid methane collecting in pool 19 passes through conduit 40 to interchanger 41 in which it is cooled by interchange against expanded and evaporating liquid nitrogen drawn from the nitrogen liquefaction cycle previously described. The cooled liquid then passes through conduit 42 and expansion valve 43 to an insulated storage tank 44 which may be maintained at 1.15 atmospheres, at which pressure the temperature of the liquid will be about 113° K. The composition of the liquid entering the tank is approximately 0.2% nitrogen and 99.8% methane and heavier hydrocarbons. In this tank the liquid is maintained in storage until required, at which time, it is withdrawn through conduit 45 to be vaporized and distributed.

If preferred, the liquid may be withdrawn from storage by a pump 146 adapted to handling liquids, by which it is raised to some required transmission line pressure, then vaporized as at 147 and introduced into a transmission line 148 leading to a distribution system.

Due to the reduction in pressure at expansion valve 43 there is a small amount of flash from the liquid as it enters the vessel, usually about 6% of its weight. This vapor passes through conduit 46 and interchanger 47, in which its temperature is raised to 305°, then through conduit 48 to a compressor 49 which raises the pressure to 3 atmospheres, through a water-cooling step 50, through interchanger 47 in which it is cooled to about 132°, and finally through conduit 51 to the column feed at 23.

The production of flash vapor in the storage tank may be avoided by sufficiently extending the aftercooling of the column liquid by expanded and evaporating liquid nitrogen, in which case elements 46, 47, 48, 49, 50 and 51 will not be required. This liquid may be drawn from conduit 38 through branch conduit 150 and expanded by valve 151 into interchanger 41, the vaporized nitrogen returning through conduit 97 to a junction with conduit 25 leading to interchanger 29.

The refrigeration required in the above steps is provided in part by the expansion of the gas feed from intake pressure to column pressure, in part by the nitrogen cycle above described, and in part by a cascade system including an ammonia cycle, an ethylene cycle and a methane cycle.

Starting at the right hand end of Fig. 2, the ammonia cycle comprises a two-stage compression unit 52 and 54 with intercooling at 53 and aftercooling at 55, the pressure being raised to about 4 atmospheres in the first stage and to about 15 atmospheres in the second. At the latter pressure the ammonia is liquefied in the aftercooler at 311° and passes through conduit 56 into a receiver 57. The liquid then passes through conduit 58 and expansion valve 59 into a flash tank 60 maintained at about 4 atmospheres and 272° K. The flash from this tank returns through conduit 61 to the intake of second stage compressor 54.

The flashed liquid ammonia passes through conduit 62 and expansion valve 63, by which its pressure is reduced to 1.15 atmospheres and its temperature to 245°, to an interchanger 64 in which it liquefies ethylene in the next stage of the cascade. The ammonia vapor returns at about 260° through conduit 65 to the intake of first stage compressor 52.

The ethylene cycle includes a two-stage compression unit 66 and 68 with intercooling at 67 and aftercooling at 69, the pressure being raised to about 5 atmospheres in the first stage and to 22 atmospheres in the second. The compressed gas leaves the aftercooler at 311° and passes through conduit 70 to interchanger 64 in which it is liquefied at 248° by expanded and evaporating liquid ammonia. The liquefied ethylene passes through conduit 71 into a receiver 72 and thence through conduit 73 and expansion valve 74 into a flash tank 75 maintained at about 5 atmospheres, and 201°. The flash from this tank returns through conduit 76 to the intake of second stage compressor 68.

The liquefied ethylene passes through conduit 77 and expansion valve 78, by which its pressure is reduced to 1.15 atmospheres and its temperature to 171°, to interchanger 79 in which it liquefies methane in the third stage of the cascade, the ethylene vapor returning at about 260° through conduit 80 to the intake of first stage compressor 66.

The methane cycle includes a two-stage compression unit 81 and 83 with intercooling at 82 and aftercooling at 84, the pressure being raised to 6 atmospheres in the first stage and to 28 atmospheres in the second. The compressed gas leaves the aftercooler at 311° and passes through conduit 85 to interchanger 86 in which it is cooled to 290° by interchange with a returning stream of once-used methane. The partially cooled gas passes through conduit 87 to interchanger 79, in which it is liquefied at 176° by an expanded and evaporating stream of liquid ethylene.

The liquefied methane passes through conduit 88 to a receiver 89 and thence through conduit 90 and expansion valve 91 to a flash tank 92 maintained at 6 atmospheres and 139°. The flash from this tank returns through conduit 93 to the intake of second stage compressor 83.

The liquid methane thus produced supplies refrigeration to the raw gas liquefying and fractionating system at two points.

A stream of the liquid passing from flash tank 92 through conduit 94 is divided, the smaller portion passing through conduit 95 and expansion valve 96, by which its pressure is reduced to 1.5 atmospheres and its temperature to 118°, to interchanger 37 in which it effects the described liquefaction of nitrogen, passing thence through conduit 98 to interchanger 86, in which it effects the first cooling of cascade methane vapor, and returning through conduit 99 to the intake of methane compressor 81 at 270°.

The remaining quantity of liquid methane passes through conduits 94 and 100 and expansion valve 101, by which its pressure is reduced to 1.4 atmospheres and its temperature to 117° K., to interchanger 16 in which it produces the described partial liquefaction of the dehydrated gas feed. The vapor from this expansion and interchange returns through conduit 102 to the first stage methane compressor 81.

Fig. 3, to which reference is now made, illustrates a modification of the method of Fig. 2 in which the purified gas is delivered into a transmission line or distributing system at column pressure or at a higher pressure produced by recompression of the product gas.

The dehydrated gas supply enters the system through conduit 10, and is divided into two streams passing in parallel through interchangers 110 and 143. These streams are cooled to about 134° K. and partially liquefied by an expanded and evaporating stream of the liquid, principally methane, withdrawn from the bottom of fractionating column 20 and by vent nitrogen from the top of the column. The partially liquefied streams are merged in conduit 111 and pass to boiling and condensing coil 19 in which liquefaction is completed except for possible difficultly liquefiable gases such as neon or helium, the latter a fairly common component of the nitrogen-containing natural gases. If these are present the stream may be passed through conduit 112 to a separator 113 from which uncondensed gases are vented at 114. The liquid then passes through conduit 21 and expansion valve 22, by which it is reduced to column pressure, to the medial point 23 at which it is introduced into the column. As before described, this may be a single stage column, provided with bubble plates, or other form of fractionating column as may be preferred, and is desirably maintained at about 3 atmospheres absolute.

The liquid collecting in the bottom of the column, consisting of the hydrocarbons originally present in the gas together with a minute residue of nitrogen, passes in greater part through conduit 115 and expansion valve 116, by which it is reduced to slightly over atmospheric pressure, to interchanger 110, in which it is heated to approximately the temperature at which the feed gas enters the system. The warmed gas passes through conduit 117 to a gas compressing unit generally indicated at 118, in which the pressure is raised to that required to introduce the gas into a long distance transmission line 119. In case the fractionating plant is located at the delivery end of the line a single stage compression unit at 118 may suffice for introducing the gas directly into a distribution system or into gaseous storage for later distribution.

The remainder of the liquid stream from the column is diverted through branch conduit 120 and expansion valve 121 into interchanger 122 in which it is vaporized and brought up to substantially atmospheric temperature in liquefying a stream of compressed nitrogen. The warmed gas from this interchange passes through conduit 123 to a point of junction with conduit 117 and thus to compressor 118.

Liquid nitrogen for reflexing the column is provided by a nitrogen liquefaction cycle differing somewhat from that described in connection with Fig. 2. The stream of cold nitrogen leaving the top of the column at 24 is divided, a quantity sufficient to provide the reflux required by the column passing through conduit 25 to interchanger 29, in which it is brought up to atmospheric temperature, and thence through conduit 30 to the two-stage compression and cooling unit 31—32—33—34 in which the pressure is raised to 25 atmospheres. The compressed stream flowing through conduit 35 is divided, one portion passing through valve 124 into interchanger 122 in which it is cooled and liquefied by an expanded stream of column bottom product. The remaining portion passes through valve 125 into interchanger 29 in which it is cooled by the nitrogen stream passing toward the compressor, the cooled stream passing through conduit 36 to interchanger 37 in which it is liquefied by an expanded and evaporating stream of liquid methane. The two streams of liquid nitrogen pass through conduits 126 and 38 to expansion valve 39 and thus into the upper end of the column.

Dependent on the composition of the feed gas and the closeness of fractionation, three alternatives are available in the handling of the nitrogen stream entering conduit 127. In the first alternative, the entire stream may pass through conduit 141, expansion valve 142 and exchanger 143 and be discharged through nitrogen vent 144. In exchanger 143 it is heated by interchange with a portion of the gas feed, which is thereby cooled and joins, in conduit 111, the portion of the gas feed cooled in exchanger 110.

In this alternative, the vent nitrogen has no part in liquefying the cascade ethylene, which is liquefied by exchange with boiling liquid ammonia in exchanger 64, the parallel interchanger 129 (used in the second alternative) being then inoperative.

As it is desirable to control rather closely the enthalpy of the merged stream entering coil 18 from conduit 111, there are some conditions of feed composition and closeness of fractionation under which it is uneconomical or impossible to pass all or even any part of the vent nitrogen from conduit 127 through exchanger 143. This leads to the second alternative in which a portion of the vent nitrogen takes the path just described, while the remainder passes through expansion valve 130 into interchanger 129, where it is heated in liquefying either a portion or all of the cascade ethylene, thence passing through conduit 131 to nitrogen 132. In the event that the quantity of nitrogen available for passage through 129 is insufficient to liquefy all of the cascade ethylene, the excess of ethylene is liquefied by exchange with boiling liquid ammonia in exchanger 64.

In the third alternative, the entire quantity of vent nitrogen is passed through exchanger 129 and is heated in liquefying ethylene, finally passing out through nitrogen vent 132, exchanger 143 meanwhile being inoperative, with all of the gas feed passing through interchanger 110. In this alternative, ammonia may or may not be required in exchanger 64 for liquefying part of the ethylene, depending on the amount of ethylene which the vent nitrogen is able to liquefy in exchanger 129.

The cascade system of Fig. 3 differs from that of Fig. 2 in both the methane and the ethylene liquefying stages. In Fig. 2 a single ethylene interchanger 64 is provided, the liquefaction of compressed ethylene being produced solely by expanded and evaporating liquid ammonia. In Fig. 3 the stream of compressed ethylene delivered by compressor 68 is divided, a portion passing through valved conduit 71 to interchanger 64, in which it is liquefied by boiling ammonia. The remainder of the compressed ethylene passes through a valved branch conduit 128 into an interchanger 129 in which it is liquefied by gaseous nitrogen flowing from column 20 through conduit 127 and expansion valve 130. The nitrogen, warmed by this interchange, passes out of the system as described. The ethylene liquefied by these interchanges flows through conduits 71 and 133 into receiver 72, thereafter taking the course previously described.

The methane cycle differs from that of Fig. 2 in two respects. Thus, interchangers 86 and 79 are arranged in parallel, both delivering liquid methane into receiver 89, interchanger 86 being supplied with gaseous methane through branch conduit 133 and draining through conduit 134. Nitrogen liquefier 37 is cooled by liquid methane passing to it from flash tank 92 through conduit 135 and expansion valve 136, the methane vapor resulting from the interchange returning to compressor 81 through conduit 98, interchanger 86 and conduit 99. The cooling of the nitrogen liquefier is the only use of liquid methane in this modification of the invention and the capacity of the cascade system is correspondingly reduced.

Fig. 4 illustrates a modification of the invention in which a pump adapted to raise liquefied gases to a high pressure replaces the compression unit 118 of Fig. 3, the column liquid being passed through a vaporizing interchanger on its way to the intake of a transmission line.

Referring to Fig. 4, the liquefaction of the gas feed is effected in interchangers 14 and 16 and condensing coil 18 by interchanges with gaseous column nitrogen, expanded cascade methane and boiling column liquid, the first two interchanges being in parallel and the third in series with the two. Thus, the feed stream passing through conduit 10 is divided between interchangers 14 and 16 in proportion to the amount of refrigeration available in each, the first being cooled by vent nitrogen from the column, passing through conduit 26 and expansion valve 27 and being vented, after warming by interchange, through nitrogen vent 129. The second interchanger 16 is cooled by cascade methane passing through conduits 94 and 100 and expansion valve 101, the expanded and warmed methane returning to compressor 81 through conduit 102. The refrigerated gas, which may be partly liquid, leaves the interchangers through conduits 15 and 17, the latter leading to coil 18 from which it passes through conduit 21 and expansion valve 22 into the column. The feed entering the column may be wholly liquid, or partially liquefied, or even gaseous, liquefaction in the column of any vaporous feed being produced by increasing the supply of reflux liquid over that required for fractionating a liquid feed.

The liquid collecting in the column, consisting of normally gaseous hydrocarbons together with a reduced and ordinarily very small proportion of nitrogen, is preferably cooled below column temperature in interchanger 41, passing thence to a pump 140 capable of raising it, in the liquid form, to whatever pressure is required at the transmission line intake. The liquid passes from the pump through conduit 46 to interchanger 86, in which it is vaporized without substantial change in pressure in liquefying part of the required supply of cascade methane, the high-pressure purified gas passing thence directly into transmission line 119.

The initial cooling of the reflux nitrogen is effected by gaseous column nitrogen on its way to compressor 31, as previously described, and the liquefaction of the cooled nitrogen by expanded cascade methane drawn from conduit 100 through branch conduit 137 and expansion valve 138 and returned to compressor 81 through conduits 139 and 99.

The cascade system of Fig. 4 is identical with that of Fig. 2 in the ammonia and ethylene cycles and with that of Fig. 3 in the methane liquefying cycle.

Numerous and important advantages are realized from the removal of a material part of the nitrogen prior to transmission of the gas to a distant point:

(a) The therm transmitting capacity of any given pipe line is increased by the removal of the inert diluent and the concentration of the original fuel value of the gas into a smaller volume and weight;

(b) The horsepower required to transmit the gas over a long distance is considerably reduced, both by reduction in quantity of gas which must be transmitted per unit of heat transmitted and by reason of the more ready compressibility of the hydrocarbon-enriched residue;

(c) An important saving in cooling water consumption is effected, by reason of the higher temperature of nitrogen at any given discharge pressure and the elimination of the nitrogen;

(d) The thermal storage capacity of the line itself and of any additional storage vessels which may be provided are increased in proportion to the quantity of nitrogen removed;

(e) The removal of the nitrogen, if present in material proportion in the field gas, often or usually permits the separation and recovery as a salable product of the higher boiling hydrocarbons (propane and heavier) without reduction in the heating value of the gas or with the maintenance of a specified B.t.u. requirement;

(f) The removal of higher boiling hydrocarbons thus permitted often greatly improves line operating conditions, avoiding risk of condensation in and trapping of the line;

(g) The removal of nitrogen permits the use of gas from fields of which the product is initially of too low heating value to be useful commercially;

(h) The removal of nitrogen permits standardization of heating value of a gas supply drawn simultaneously and in varying proportions from fields or wells producing gases of different compositions;

(i) The removal of nitrogen and consequent increase in calorific value permits attainment of higher flame temperatures which, in many industrial operations greatly increases the efficiency of high-temperature heating steps, by increasing the range between the flame temperature and the temperature to which the work must be brought;

(j) The removal of nitrogen makes it possible to increase the average therm load factor of the transmission line by permitting it to care for a larger average distribution load.

The step of removing nitrogen from contaminated natural gas is particularly desirable in instances in which any part of the gas supply is to be stored in liquid form, thus:

(k) The storage of inert material is avoided—a given vessel will hold more therms by reason of the concentration of the original heating value into a smaller liquid volume;

(l) In the more usual instance, in which the gas is deprived of nitrogen before long distance transmission and reliquefied for storage at the delivery end of the line, the quantity of heat to be removed in the reliquefying plant is reduced;

(m) The temperatures of reliquefaction and of storage are materially raised, avoiding the use of the extremely low temperatrues which are the most costly to attain;

(n) Elevation of the temperature of the liquid-storage vessel reduces heat infiltration through any given vessel insulation and (o) Reduces embrittlement of ferrous materials used in storage vessels;

(p) Change in composition of the liquid, which follows from fractional vaporization of nitrogen, is eliminated by nitrogen removal and (q) Materially less heat is required for the vaporization of the liquid when required for use in the gaseous phase;

(r) The minimum temperature encountered in revaporizing the liquid is increased and the liability to freezing of the heating fluids used in vaporizing is reduced.

The steps of removing a material proportion of nitrogen prior to long distance transmission and of placing part of the transmitted gas in storage at the delivery end of the line, at times of less than average demand, to be drawn on to help meet demands greater than average, are highly cooperative. Not only does the removal of the nitrogen increase the transmitting capacity of the line and the storage capacity of both the line and the delivery-end storage, thus permitting smaller pipe lines and storage units to carry a given load, but also the provision of storage capacity materially improves the functioning of the nitrogen-removal plant.

Demands of a distribution system for gas vary widely from day to day or even from hour to hour, this variation being seldom less than three to one and often much greater. This variation in demand has, in the past, been compensated in various ways, as for example by "packing" the line (raising the line pressure and thus increasing the quantity of gas in transit), and cutting off so-called "interruptible" loads at times of increased domestic demand (involving major price concessions to such industrial users) and similar expedients.

Both the transmission line and the nitrogen removal plant function most economically under an unvarying load. The provision of storage at the delivery end of the line, in quantity sufficient to supply the difference between average demand and maximum demand for the anticipated period, permtis the pipe line to deliver, and therefore to take from the nitrogen removal plant, a constant quantity. With this provision, both the nitrogen removal plant and the pipe line need be only of such capacity and dimensions as to carry the average load, rather than the maximum, and both first cost and operating cost are reduced.

Or, for a transmission line of fixed size, equipped with a storage facility, the average therm load factor of the line can be increased through its increased ability to meet peak demand, which enables it to supply an increased average demand, because the average demand which the operator may commit the line to supply is limited by the ability of the system to meet peak demands successfully.

In removing a relatively large proportion of nitrogen, even with simultaneous separation of valuable liquids of high heating value, it may occur that the calorific value of the residual gas is raised above that required by local custom or ordinances. In such cases the overly rich gas may be diluted back to the requirement by the admixture of gases of lower or no heating value, for example, coke oven gas, producer gas, nitrogen contaminated natural gas, combustion gases or air.

Given a source of fuel gas of relatively high thermal value and, at a distance therefrom, a fluctuating demand for a gas of relatively low thermal value, economy in the investment and operating cost can be attained by transmitting the high thermal value gas to a point as close as is convenient to the demand, storing, in times of reduced demand, a portion of the transmitted gas in its undiluted state, meanwhile diluting another portion of the transmitted gas with air, flue gas, coal gas, coke oven gas, producer gas, water gas, or any suitable material in order to reduce its thermal value to that required by the demand, and supplying the demand with the diluted gas. In times of increased demand, high thermal value gas can be removed from storage, diluted as above, and directed to the demand to augment the supply available by diluting the current delivery of the line. In event of line delivery interruption, the gas removed from storage and diluted can entirely replace line delivery and dilution.

With a line of fixed size, the addition of such a storage facility and operation according to the above method will permit the increase of the average therm load factor of the line, as compared with the transmission of diluted gas with or without storage, or with the transmission of rich gas, its dilution and storage in the diluted condition of a portion for subsequent use.

Provisions are made for this operation in the showing of Fig. 1 by the cross-over line Z connecting the field line F with conduit G—H leading to the storage plant and conduit G—H—K leading to the distribution system, and by the injecting connection Z' into conduit J ahead of distribution.

I claim as my invention:

1. A manipulation of natural hydrocarbon gas initially contaminated with nitrogen, comprising: refrigerating said gas; subjecting the refrigerated material to a fractionation employing a reflux liquid and thereby separating a vapor enriched in nitrogen from a liquid enriched in hydrocarbons; passing a portion of said vapor in heat interchange with a compressed gas and thereby liquefying said compressed gas to produce a liquid refrigerant; evaporating said liquid refrigerant in heat interchange with a second compressed gas to produce a second liquid refrigerant having a lower boiling point than first said liquid refrigerant, and evaporating said second liquid refrigerant in heat interchange with another portion of said vapor to produce at least a portion of the reflux liquid for said fractionation.

2. In the fractionation of a refrigerated natural gas initially contaminated with nitrogen, in which a vapor enriched in nitrogen is separated from a liquid enriched in hydrocarbons, the steps comprising: providing reflux liquid for said fractionation by liquefying a portion of said vapor by heat interchange with boiling liquid methane; producing said liquid methane by heat interchange between a stream of compressed gaseous methane and a stream of boiling liquid ethylene, and producing at least a portion of said liquid ethylene by heat interchange between a stream of compressed gaseous ethylene and another portion of the vapor produced by said fractionation.

3. In the production of a stream of liquid refrigerant predominantly methane, the steps comprising: compressing a stream of warm gas consisting principally of methane; dividing the compressed stream into branch streams; liquefying one of said branch streams by heat interchange with a boiling liquid refrigerant; liquefying a second branch stream by heat interchange with a stream of expanded refrigerant, predominantly methane, from a previous use; merging said branch streams to form a stream of liquid refrigerant, and expanding and heating a portion of last said stream in the previous use aforesaid.

4. In the production of refrigeration at low temperatures the steps comprising: compressing a stream of methane gas in a plurality of stages and cooling the stream to remove the heat of compression; refrigerating and thereby liquefying said compressed stream; producing a first vapor stream and a residual liquid by expanding said liquid stream to the pressure of an intermediate compression stage; separating the residual liquid and then producing a refrigerating effect by vaporizing the residual liquid to produce a second vapor stream; interchanging at least one of said vapor streams with the cooled compressed stream to supply at least part of the refrigeration required for liquefaction thereof; conducting the first vapor stream to an intermediate compression stage and conducting the second vapor stream to the initial compression stage.

5. The process of claim 4 in which said refrigeration effect is utilized at least in part to liquefy a stream of gas predominantly nitrogen, and conducting the resultant liquid to a fractionating operation to serve as reflux therein.

References Cited in the file of this patent

UNITED STATES PATENTS

| | | |
|---|---|---|
| 1,843,043 | Patart | Jan. 26, 1932 |
| 2,082,189 | Twomey | June 1, 1937 |
| 2,180,435 | Schlitt | Nov. 21, 1939 |
| 2,265,558 | Ward et al. | Dec. 9, 1941 |
| 2,424,201 | Van Nuys | July 15, 1947 |
| 2,475,957 | Gilmore | July 12, 1949 |
| 2,500,118 | Cooper | Mar. 7, 1950 |
| 2,508,821 | Gammill | May 23, 1950 |
| 2,534,478 | Roberts | Dec. 19, 1950 |
| 2,541,569 | Born | Feb. 13, 1951 |
| 2,557,171 | Bodle | June 19, 1951 |
| 2,600,110 | Hachmuth | June 10, 1952 |
| 2,658,360 | Miller | Nov. 10, 1953 |
| 2,677,945 | Miller | May 11, 1954 |